United States Patent Office 3,799,922
Patented Mar. 26, 1974

3,799,922
4-SUBSTITUTED 3-CEPHEM COMPOUNDS
Timothy Yu-Wen Jen, Broomall, Pa., and Jerry A. Weisbach, Cherry Hill, N.J., assignors to Smithkline Corporation, Philadelphia, Pa.
No Drawing. Filed Nov. 17, 1971, Ser. No. 199,751
Int. Cl. C07d 99/24
U.S. Cl. 260—243 C     13 Claims

ABSTRACT OF THE DISCLOSURE 4-diazoacetylcephalosporins are prepared from the reaction of the 4-carboxylic acid chlorides with diazomethane. These compounds are intermediates useful for preparing 4-acetic acids and 4-haloacetyl compounds which have antibacterial activity. 4-hydroxymethylcephalosporins are prepared by reduction of the 4-carboxylic acid chlorides.

---

This invention relates to chemical compounds known as cephalosporins. In particular, this invention relates to cephalosporins having a 4-hydroxymethyl, a 4-diazoketo group, or other 4-substituents obtained by further reaction of the diazoketo group.

The compounds of this invention are represented by structural Formula I:

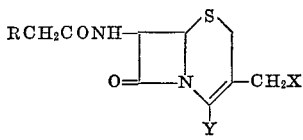

in which:

R is phenyl or thienyl;
X is hydrogen or acetoxy;
Y is $CH_2OH$, $COCHN_2$, $CH_2COOM$, $COCH_2Cl$ or $COCH_2Br$ and
M is hydrogen or a pharmaceutically acceptable cation.

The diazoketocephalosporins are prepared from their corresponding cephalosporanic acids which are known in the prior art. In general, the acid or its alkali metal salt is converted to its acyl halide derivative by reaction with one of the well known acyl halide forming reagents in an inert solvent. Such reagents include oxalyl chloride, phosphorus pentachloride, phosphorus trichloride and thionyl chloride. The acyl halide is then reacted with diazomethane to give the diazoketone or reduced to the hydroxymethyl compound.

A preferred method is to react oxalyl chloride with a suspension of the acid or its sodium salt in an anhydrous solvent such as methylene chloride or benzene at a temperature of ten degrees or less. The acid chloride can be purified prior to the next reaction or reacted directly with ethereal diazomethane to give the diazoketo compound or reduced with lithium tri-t-butoxyaluminum hydride to give the hydroxymethyl compound.

Wolff rearrangement of the diazoketone in the presence of water gives the 4-acetic acid compound. In particular, photolysis of 4 - (α-diazoacetyl)-3-methyl-7-(2-thienylacetamido)-ceph-3-em in 15% aqueous dioxane gives 4-carboxymethyl-3-methyl - 7 - (2-thienylacetamido)-ceph-3-em.

When the diazoketo compound is reacted with hydrohalic acids the expected adducts are formed. For example, reaction with ethereal hydrochloric acid or hydrobromic acid gives the corresponding α-haloacetyl compound.

The interrelationship between the various compounds of this invention is conveniently shown in the chart below.

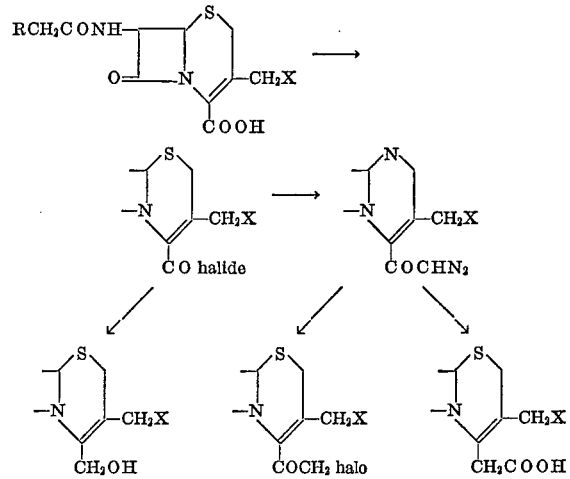

Although the diazoketo compounds have only low antibacterial activity they are very useful compounds for preparing cephalosprins that have antibacterial activity; in particular, they are used to prepare the compounds of Formula I where Y is $CH_2COOM$, $COCH_2Cl$ or $COCH_2Br$; these compounds are antibacterial agents. For example, 4-carboxymethyl - 3 - methyl-7-(2-thienylacetamido)-ceph-3-em has a minimum inhibitory concentration (MIC) by the conventional agar inclusion method of 50 μg./ml. against *Staphylococcus aureus* and *Diplococcus pneumoniae*. Also, 3 - acetoxymethyl-4-carboxymethyl-7-(2-thienylacetamido)-ceph - 3 - em has MIC's against *Staphylococcus aureus* and *Diplococcus pneumoniae* of 50 and 25 μg./ml., respectively. In addition, 3-acetoxymethyl-4-(α-chloroacetyl) - 7 - (2-thienylacetamido)-ceph-3-em has MIC's of 50 and 25 μg./ml. against *Staphylococcus aureus* and *Streptococcus pyogenes*, respectively.

The compounds of Formula I where Y is $CH_2OH$ are also antibacterial agents. For example, 3-acetoxymethyl-4-hydroxymethyl - 7 - (2-thienylacetamido)-3-cephem has MIC's against *Staphylococcus pyogenes* and *Diplococcus pneumoniae* of 6.3–12.5 and 12.5–25 μg./ml., respectively.

The antibacterial compounds are administered to the subject by injection. The injectable formulations are prepared in the same manner as for other cephalosporin antibiotics. The dose will vary with the nature and severity of the infection as well as the age, weight, and condition of the subject.

The compounds containing a carboxylic acid group may be used in their pharmaceutically acceptable cationic salt form, which are therefore also part of the invention. Preferred cations are the alkali metal and ammonium cations. The salts are prepared by treating a solution of the acid with the base or alcoholic solution of the base. The base may be an organic amine or the alkali salt of a weak acid, for example, sodium 2-ethyl hexanoate.

The following examples are intended to illustrate the preparation of the compounds of the invention but are not to be construed as limiting the scope thereof.

EXAMPLE 1

4-(α-diazoacetyl)-3-methyl-7-(2-thienylacetamido)-ceph-3-em

To a stirring suspension of 3-methyl-7-(2-thienylacetamido)-3-cepham-4-carboxylic acid (13.0 g., 0.038 mole) in dry methylene chloride (500 ml.) and DMF (0.5 ml.) cooled to −2° was added dropwise over a 10 minute period a solution of oxalyl chloride (10.6 g., 0.0836 mole) in dry methylene chloride (20 ml.). The mixture was stirred 1.5 hours at 0–10°, hexane was added to precipitate additional acid chloride which was collected and washed with hexane and ether. The crude product was digested with warm methylene chloride, hexane was added, and after cooling the product was collected.

The acid chloride (11 g., 0.038 mole) was suspended in THF (300 ml.) and added in small portions at −5° to an ether solution of diazomethane generated from N-methyl-N-nitroso-N'-nitroguanidine (20 g.). After stirring with cooling one hour, the solid was collected and washed with hexane. The title compound was recrystallized from acetone-hexane, M.P. 183–185° C.

EXAMPLE 2

3-acetoxymethyl-4-(α-diazoacetyl)-7-(2-thienylacetamido)-3-cepham

A solution of oxalyl chloride (0.607 g., 4.78 mmol) in anhydrous benzene (10 ml.) was added to a suspension of 7-(2-thienylacetamido)cephalosporanic acid sodium salt (1.0 g., 2.39 mmol) in anhydrous benzene (80 ml.). After stirring at 6° for one hour and at room temperature 0.5 hour the solvent was removed in vacuo to give the solid acid chloride.

An ethereal diazomethane solution (prepared from 3.1 g. of N-methyl-N-nitroso-N'-nitroguanidine) was added at −5° to the acid chloride dissolved in dry methylene chloride (50 ml.). The reaction was then stirred at room temperature for 45 minutes. The solvent was removed, the residue was dissolved in methylene chloride and washed with saturated NaCl solution. After drying the organic layer, evaporation gave the product. The crude product was dissolved in warm methylene chloride, precipitated with ether and collected; M.P. 172–174° C.

EXAMPLE 3

3-acetoxymethyl-4-carboxymethyl-7-(2-thienylacetamido)-3-cephem

A solution of the diazoketone from Example 2 (2 g., 4.8 mmol) in 25% aqueous dioxane (500 ml.) was photolyzed 7.5 hours under a nitrogen atmosphere using a water cooled immersion well with an ultra-violet light source filtered through Pyrex glass. The solution was concentrated and the water was removed using an ethanol-benzene azeotrope system. The residue was dissolved in hot ethyl acetate and was filtered from insoluble material. The filtrate was concentrated and dicyclohexylamine (1 ml.) was added. The salt was precipitated by the addition of ether and was collected. The salt was chromatographed on a small Florisil column eluting an impurity with ethyl acetate and then the product with ethyl acetate-methanol. The salt was dissolved in water, acidified with HCl, and extracted with ethyl acetate. Evaporation of the organic extracts gave the title compound; M.P. 70–75° C.

EXAMPLE 4

4-carboxymethyl-3-methyl-7-(2-thienylacetamido)-3-cephem

A solution of diazoketone from Example 1 (3.0 g., 8.4 mmol) in 15% aqueous dioxane was photolyzed overnight under a nitrogen atmosphere using a water cooled immersion well and an ultra-violet light source. The reaction solution was evaporated and the residue azeotroped with an ethanol-benzene system to give a dark amorphous product. The product was chromatographed on Florisil eluting impurities with 1:1 ether:ethyl acetate. Ethyl acetate-methanol eluted the product.

EXAMPLE 5

4-(α-bromoacetyl)-3-methyl-7-(2-thienylacetamido)-3-cephem

The diazoketone from Example 1 (1.0 g., 2.8 mmol) was dissolved in dry THF and treated with an excess of ethereal HBr at room temperature. After five minutes the solution was decolorized with charcoal, filtered and evaporated to dryness. The residue was recrystallized from acetone-hexane to give pure product.

EXAMPLE 6

3-acetoxymethyl-4-(α-bromoacetyl)-7-thienylacetamido)-3-cephem

The diazoketone from Example 2 (1.0 g., 2.4 mmol) was dissolved in dry THF and stirred with excess ethereal HBr. After 30 minutes at room temperature the solution was evaporated and the product was recrystallized from acetone-hexane; M.P. 180° C. (dec.).

EXAMPLE 7

4-(α-chloroacetyl)-3-methyl-7-(2-thienylacetamido)-3-cephem

When ethereal HCl is substituted in Example 5 for ethereal HBr the title compound will be obtained.

EXAMPLE 8

3-acetoxymethyl-4-(α-chloroacetyl)-7-(2-thienylacetamido)-3-cephem

When ethereal HCl was substituted for ethereal HBr in Example 6, the title compound was obtained; M.P. 194–197° C. (dec.).

EXAMPLE 9

When 3 - methyl - 7 - phenylacetamido-3-cephem-4-carboxylic acid was substituted for 3-methyl-7-(2-thienylacetamido) - 3 - cephem - 4 - carboxylic acid in Example 1, 4 - (α-diazoacetyl) - 3 - methyl - 7 - phenylacetamido - 3 - cephem was produced, M.P. 171–172° C.

EXAMPLE 10

When 3 - acetoxymethyl-7-phenylacetamido-3-cephem-4-carboxylic acid is substituted for 3-acetoxymethyl-7-(2-thienylacetamido) - 3 - cephem - 4 - carboxylic acid in Example 2, 3 - acetoxymethyl - 4 -(α-diazoacetyl)-7-phenylacetamido-3-cephem will be produced.

EXAMPLE 11

When 3 - acetoxymethyl - 4 - (α-diazoacetyl)-7-phenylacetamido-3-cephem is substituted for 3-acetoxymethyl-4 - (α-diazoacetyl) - 7 - (2 - thienylacetamido)-3-cephem in Example 3, 3 - acetoxymethyl - 4-carboxymethyl-7-phenylacetamido-3-cephem will be obtained.

EXAMPLE 12

When 4 - (α-diazoacetyl) - 3 - methyl - 7 - phenylacetamido - 3 - cephem is substituted for 4-(α-diazoacetyl) - 3 - methyl - 7 - (2-thienylacetamide)-3-cephem in Example 4, 4 - carboxymethyl - 3 - methyl - 7 - phenylacetamido-3-cephem will be obtained.

EXAMPLE 13

When 3 - acetoxymethyl - 4 - (α-diazoacetyl)-7-phenylacetamido-3-cephem is substituted for 3-acetoxymethyl-4 - (α-diazoacetyl) - 7 - (2-thienylacetamido)-3-cephem in Examples 6 and 8, 3-acetoxymethyl-4-(α-bromoacetyl) - 7 - phenylacetamido-3-cephem and 3-acetoxymethyl - 4 - (α-chloroacetyl)-7-phenylacetamido-3-cephem, respectively, will be obtained.

EXAMPLE 14

When 4 - (α-diazoacetyl) - 3 - methyl - 7 - phenylacetamido-3-cephem is substituted for 4-(α-diazoacetyl)-3-methyl-7-(2-thienylacetamido)-3-cephem in Examples 5 and 7, 4-(α-bromoacetyl)-3-methyl-7-phenylacetamido-3-cephem and 4-(α-chloroacetyl)-3-methyl-7-phenylacetamido-3-cephem, respectively, will be obtained.

EXAMPLE 15

3-acetoxymethyl-4-hydroxymethyl-7-(2-thienylacetamido)-3-cephem

To a cold solution of the acid chloride prepared in Example 2 (15 g., 0.039 mol) in THF (250 ml.) was added over a 20 minute period a solution of lithium tri-t-butoxyaluminum hydride (22 g., 0.082 mol) in THF (150 ml.). After stirring 40 minutes, the reaction was poured into cold dilute HCl. The solution was adjusted to pH 2 and extracted with ethyl acetate. The organic extracts were washed with 5% NaHCO₃ and then with brine solution. The organic layer was dried and evaporated in vacuo to a solid product which was dissolved in hot acetone and precipitated by the addition of hexane; M.P. 172–173° C.

EXAMPLE 16

When an equivalent amount of the acid chloride prepared in Example 1 is used as the acid chloride in Example 15, 4-hydroxymethyl-3-methyl-7-(2-thienylacetamido)-3-cephem will be obtained.

What is claimed is:

1. A compound of the structure:

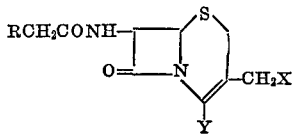

in which:
R is phenyl or thienyl;
X is hydrogen or acetoxy;
Y is $CH_2OH$, $COCHN_2$, $CH_2COOM$, $COCH_2Cl$, or $COCH_2Br$; and
M is hydrogen or a pharmaceutically acceptable cation.

2. A compound as claimed in claim 1, where Y is $COCHN_2$.
3. A compound as claimed in claim 2, where R is phenyl and X is hydrogen.
4. A compound as claimed in claim 2, where R is phenyl and X is acetoxy.
5. A compound as claimed in claim 2, where R is thienyl and X is hydrogen.
6. A compound as claimed in claim 2, where R is thienyl and X is acetoxy.
7. A compound as claimed in claim 1, where X is hydrogen and Y is $COCH_2Cl$.
8. A compound as claimed in claim 1, where X is hydrogen and Y is $COCH_2Br$.
9. A compound as claimed in claim 1, where X is hydrogen, Y is $CH_2COOM$ and M is hydrogen.
10. A compound as claimed in claim 1, where X is acetoxy and Y is $COCH_2Cl$.
11. A compound as claimed in claim 1, where X is acetoxy and Y is $COCH_2Br$.
12. A compound as claimed in claim 1, where X is acetoxy, Y is $CH_2COOM$ and M is hydrogen.
13. A compound as claimed in claim 1, where Y is $CH_2OH$.

References Cited

UNITED STATES PATENTS

| | | | |
|---|---|---|---|
| 3,591,585 | 7/1971 | Hatfield | 260—243 C |
| 3,641,014 | 2/1972 | Murphy et al. | 260—243 C |
| 3,704,297 | 11/1972 | Dvonch et al. | 260—243 C |
| 3,549,628 | 12/1970 | Chauvette | 260—243 C |

NICHOLAS S. RIZZO, Primary Examiner

U.S. Cl. X.R.

424—246